US008139839B2

(12) United States Patent
Giering et al.

(10) Patent No.: US 8,139,839 B2
(45) Date of Patent: Mar. 20, 2012

(54) APPARATUS FOR CHECKING THE AUTHENTICITY OF BANKNOTES

(75) Inventors: Thomas Giering, Kirchseeon (DE); Franz Müller, München (DE); Wolfgang Rapf, München (DE); Dieter Stein, Holzkirchen (DE); Wolfgang Deckenbach, Schechen (DE); Walter Straub, Oberhaching (DE); Klaus Thierauf, München (DE)

(73) Assignee: Giesecke & Devrient GmbH, Munich (DE)

( * ) Notice: Subject to any disclaimer, the term of this patent is extended or adjusted under 35 U.S.C. 154(b) by 907 days.

(21) Appl. No.: 12/085,366

(22) PCT Filed: Nov. 21, 2006

(86) PCT No.: PCT/EP2006/011147

§ 371 (c)(1), (2), (4) Date: Jul. 25, 2008

(87) PCT Pub. No.: WO2007/059923

PCT Pub. Date: May 31, 2007

(65) Prior Publication Data

US 2009/0028415 A1 Jan. 29, 2009

(30) Foreign Application Priority Data

Nov. 22, 2005 (DE) ........................ 10 2005 055 682

(51) Int. Cl.
*G06K 9/00* (2006.01)

(52) U.S. Cl. .................... 382/137; 194/4; 194/5; 194/6; 194/7; 194/8; 209/534; 209/535; 209/536; 209/537; 209/538; 235/379; 235/380; 235/381; 235/382; 235/383

(58) Field of Classification Search .................. 382/100, 382/135–140; 194/4–12; 209/534–540; 235/379–388; 250/200–210; 356/71–77; 902/7–11; 705/45–50
See application file for complete search history.

(56) References Cited

U.S. PATENT DOCUMENTS 3,656,835 A 4/1972 Johnson et al.
3,938,663 A 2/1976 Carnes et al.
(Continued)

FOREIGN PATENT DOCUMENTS

DE 27 54 267 A1 6/1978
(Continued)

OTHER PUBLICATIONS

Search Report of German Patent Office regarding German Patent Application No. 10 2005 055 682.5, Jul. 31, 2006.

*Primary Examiner* — Atiba O Fitzpatrick
(74) *Attorney, Agent, or Firm* — Bacon & Thomas, PLLC

(57) ABSTRACT

An apparatus for checking the authenticity of bank notes in unprotected areas, has a sensor assembly containing a light source which produces light of a first wavelength with which the bank notes to be checked are illuminated; whereupon one or more feature substances present in and/or on the bank notes produces light of a second wavelength which is detected by the sensor assembly. A control device evaluates data from the sensor assembly about the light of the second wavelength and compares them with reference data to determine the authenticity of the bank notes. The structure and operation of the sensor assembly and/or the control device permit conclusions to be drawn only with difficulty on the feature substance or substances contained in the bank notes.

17 Claims, 1 Drawing Sheet

U.S. PATENT DOCUMENTS

| | | | | | |
|---|---|---|---|---|---|
| 5,443,144 | A | * | 8/1995 | Dobbins et al. | 194/317 |
| 5,652,802 | A | | 7/1997 | Graves et al. | |
| 5,918,960 | A | * | 7/1999 | Hopwood et al. | 356/71 |
| 7,067,824 | B2 | * | 6/2006 | Muller et al. | 250/458.1 |
| 2002/0082962 | A1 | * | 6/2002 | Farris et al. | 705/35 |
| 2003/0009420 | A1 | * | 1/2003 | Jones | 705/39 |
| 2003/0059098 | A1 | * | 3/2003 | Jones et al. | 382/135 |

FOREIGN PATENT DOCUMENTS

| | | | |
|---|---|---|---|
| DE | 21 31 484 | A1 | 4/1982 |
| DE | 31 21 523 | A1 | 4/1982 |
| DE | 30 48 734 | A1 | 7/1982 |
| DE | 34 46 861 | A1 | 7/1986 |
| DE | 100 29 051 | A1 | 12/2001 |
| DE | 101 59 234 | A1 | 6/2003 |
| DE | 103 46 631 | A1 | 5/2005 |
| DE | 103 60 860 | A1 | 7/2005 |
| EP | 0 881 603 | A1 | 12/1998 |
| EP | 1 237 128 | A1 | 9/2002 |
| EP | 1 291 828 | A2 | 3/2003 |
| WO | WO 2005/010507 | A2 | 2/2005 |

* cited by examiner

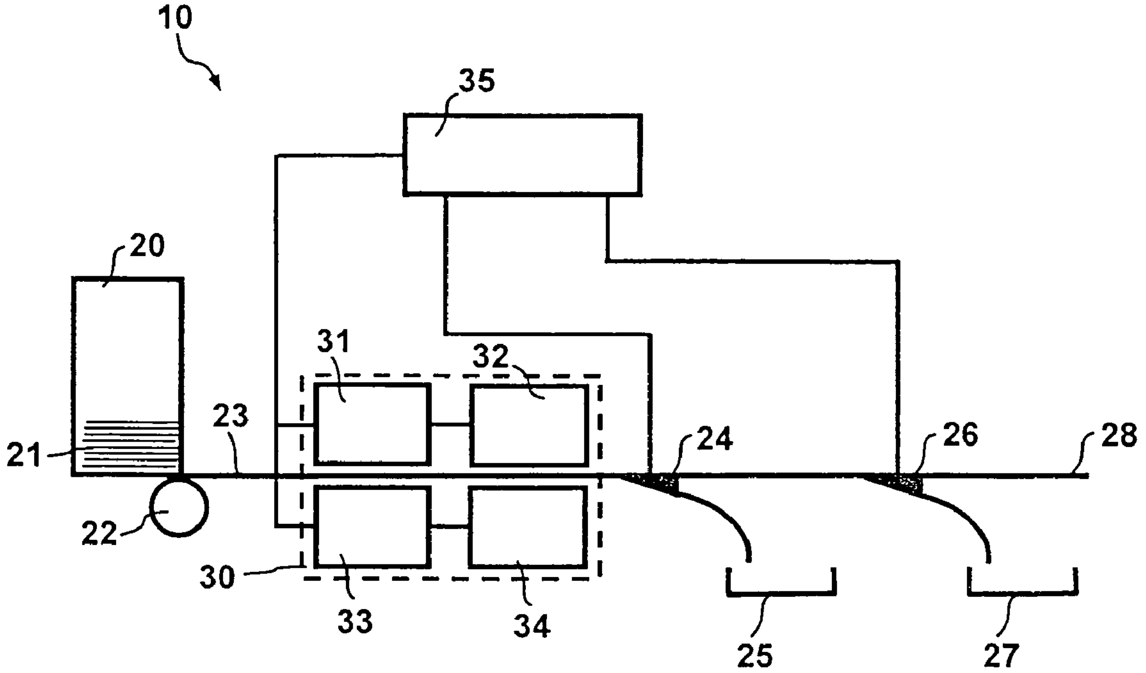
10
35
20
31
32
23
21
24
26
28
22
30
33
34
25
27

APPARATUS FOR CHECKING THE AUTHENTICITY OF BANKNOTES

FIELD OF THE INVENTION

The present invention relates to an apparatus for checking the authenticity of bank notes in unprotected areas.

BACKGROUND

To permit a check of the authenticity of bank notes, a multiplicity of apparatuses have been proposed. It has become known, for example, to detect feature substances present in bank notes by means of a sensor in order to check the authenticity of the particular bank note. As a rule, the bank notes are illuminated for this purpose with light of a certain wavelength. The light of the certain wavelength excites the feature substances to themselves emit light of another wavelength, so-called luminescent light. The light remitted by the bank notes is detected by a detector and the bank notes are recognized as authentic if the detector detects the luminescent light.

With known apparatuses it is readily possible to check the authenticity of the bank notes, but known apparatuses also offer starting-points for forgers to ascertain without any great effort how the check of authenticity of the bank notes is carried out. This only requires for example determining the wavelength of the illumination as well as the wavelength of the light remitted by the bank notes. The wavelengths then permit conclusions to be drawn on the feature substances used in the bank notes.

Known apparatuses for checking the authenticity of bank notes thus have the disadvantage of leading upon their use—up to a certain extent—to an unmasking of the feature substances used for securing the authenticity of the bank notes. This is particularly problematic when the apparatuses are used in unprotected areas, e.g. in places where they are accessible to a broad group of people. Such apparatuses are in particular relatively small bank note processing machines for counting, accounting for and evaluating bank notes, but also testing devices for accepting and/or dispensing bank notes.

SUMMARY

It is therefore the object of the present invention to specify an apparatus for checking the authenticity of bank notes which permits a reliable recognition of the authenticity of bank notes, whereby the structure and mode of operation of the apparatus should provide as few indications as possible of the security concepts used for protecting the bank notes, in particular the employed feature substances, so that the apparatus can also be used in unprotected areas.

The invention starts out from an apparatus for checking the authenticity of bank notes in unprotected areas, having a sensor assembly containing a light source which produces light of a first wavelength, with which the bank notes to be checked are illuminated, whereupon one or more feature substances present in and/or on the bank notes produce light of a second wavelength which is detected by the sensor assembly, and a control device which evaluates data from the sensor assembly about the light of the second wavelength and compares them with reference data to determine the authenticity of the bank notes, wherein structure and operation of sensor assembly and/or control device permit conclusions to be drawn only with difficulty on the feature substance or substances contained in the bank notes.

The invention thus has in particular the advantage that the apparatus makes it possible to check confidential feature substances for determining the authenticity of bank notes in areas that are accessible to a broad public or to the general public without an unmasking or recognition of the feature substances being readily possible. This permits a very safe check of the authenticity of bank notes by means of feature substances even for simple and unelaborate apparatuses for processing and accepting bank notes, for example for small bank note processing machines for counting and sorting bank notes in the front-office area, bank note testing devices for cash deposit machines, vending machines, etc.

In a preferred embodiment it is provided that the sensor assembly and the control device detect and evaluate at least one further property of the bank notes, e.g. their size, color, etc. The check of the feature substance or substances is only carried out if the presence of a bank note was indicated upon the check of the at least one further property.

The preferred embodiment has the advantage of thus permitting an increased protection to be obtained, since simple attempts at forgery intended to lead to the unmasking of the employed feature substances are immediately recognized and there is no check of the feature substances by the apparatus. It is thus not recognizable how the check of the feature substances is carried out, which gives them special protection against being spied out.

In a further preferred embodiment it is provided that the light source used for producing the light of the first wavelength and/or sensors of the sensor assembly used for detecting the light of the second wavelength are constructed without specific filters for the first and/or second wavelength.

The preferred further embodiment has the advantage that not already a mere examination of the filters permits conclusions to be drawn on the employed feature substances, thereby permitting an improved protection against spying out.

In another preferred embodiment it is provided that during the check of the bank notes the apparatus carries out measurements and evaluations comprising interdependent examination steps.

The preferred other embodiment has the advantage that the linking of different examination steps impedes the recognition of the employed feature substances, since considerable effort is necessary for recognizing the interdependent examination steps by random trial.

In yet another preferred embodiment it is provided that the sensor assembly and the control device detect and evaluate feature substances whereby the light source of the sensor assembly produces the light of the first wavelength alternatingly with different amplitude and/or pulse width.

The preferred yet other embodiment has the advantage that feature substances can be employed in the bank notes in such a way that they conceal each other, thereby making an accidental discovery very improbable.

BRIEF DESCRIPTION OF THE DRAWINGS

The single FIGURE shows a schematic representation of a basic structure of an apparatus 10 for checking bank notes, in particular checking the authenticity of the bank notes.

DETAILED DESCRIPTION OF VARIOUS EMBODIMENTS

The apparatus 10 for checking bank notes is configured as a bank note processing machine and has an input pocket 20 for inputting bank notes 21 to be processed which is engaged by a singler 22. The singler 22 grasps one of the bank notes 21 to be processed at a time and transfers the single bank note to a transport system 23 which transports the single bank note through a sensor assembly 30.

In the sensor assembly 30 there are present for example different sensors 31, 32, 33, 34 which can check different properties of the bank notes. For example, there may be present a first optical sensor 31 which detects light remitted by a first side of the bank note, a second acoustic sensor 33 which detects ultrasonic signals coming from, in particular transmitted by, the bank note, a third optical sensor 32 which detects light transmitted by the bank note, and a fourth sensor which detects light remitted by a second side of the bank note. The sensors 31, 32, 33, 34 perform measurements for the check of the bank notes wherein they detect properties of each individual bank note and produce corresponding data. For this purpose the sensors 31, 32, 33, 34 can scan the bank notes at a certain resolution which yields a pixel size at which the bank notes are detected. In particular the optical sensors 31, 32, 34 can in this case also contain a light source which produces light of a certain first wavelength to excite feature substances contained in the bank notes. The excited feature substances in turn produce (emit) light of a certain second wavelength which can serve as proof of the authenticity of the bank notes. The wavelength of the emitted light of the second wavelength can be smaller, greater or (almost) equal to the first wavelength of the illumination light.

For measuring the feature substances it can be provided that the intensity pattern of the light of the second wavelength is measured during illumination with the light of the first wavelength and/or after the illumination is switched off. The authenticity of the bank notes is determined from the measured intensities and/or the rise behavior and/or the decay behavior.

From the detected pixels of each of the bank notes the sensors 31, 32, 33, 34 and/or a control device 35 can form data which represent each place on the surface of the particular bank note. Production of the data can be effected e.g. for one side of the bank notes, i.e. for one of the surfaces of the bank notes, or both surfaces can be detected and corresponding data provided. Preferably, the sides or surfaces of the bank notes are each detected completely and corresponding data produced for the complete side or surface.

From the data from the sensors 31, 32, 33, 34 the control device 35 derives properties which are relevant for checking the bank notes. Said properties characterize the state of the bank notes, such as soiling, stains, limpness, tears, adhesive tape, dog-ears, holes, missing parts of the bank notes, etc., the type of bank note, such as currency, denomination, series, etc., and in particular the authenticity of the bank notes. The particular properties can be derived for example from the data from one or more of the sensors 31, 32, 33, 34.

In the control device 35 the data from the sensors 31, 32, 33, 34 are processed and compared with reference data stored in the control device 35, whereupon the control device 35 determines the state of the bank notes, in particular whether the bank notes are authentic.

On the basis of the check of the particular bank note carried out by the control device 35, gates 24, 26 disposed in the transport system 23 are driven, e.g. to deposit authentic bank notes in a first output pocket 25 whereas forged and/or suspect bank notes can be deposited in a second output pocket 27. The transport system 23 can also supply bank notes to further processing 28, e.g. destruction by means of a shredder or deposit in further output pockets.

For securing the apparatus for checking the authenticity of bank notes, the sensor assembly 30 and/or the control device 35 of the apparatus 10 is configured and/or operated such that the sensor assembly 30 and/or the control device 35 and/or the operation thereof do not, or not readily, indicate the measures carried out for the authenticity check. This makes it impossible to draw conclusions on the feature substances contained in the bank notes.

For this purpose it can be provided for example that the check of the feature substance or substances is carried out by the control device 35 only when it can at least be assumed that a bank note is present. The check of the feature substance or substances is thus used as a kind of verification of at least one of the previously carried out measurements. These other measurements are performed by the sensor assembly 30 and evaluated by the control device 35 and can comprise for example the determination of size, color, certain printed patterns, certain security threads, etc. If for example a minimum number of thus checked criteria is fulfilled, it can be assumed that a bank note is present. Only in this case does the control device 35 cause the feature substances to be checked. This can be obtained by the illumination with a light of the first wavelength suitable for exciting the feature substance or substances to emit a light of the second wavelength being effected only at this time. Alternatively or additionally, an evaluation of the data from the sensor assembly 30 by the control device 35 can be carried out only after this time.

It is common to use specific filters in front of the light source or sensor for producing the light of the first wavelength for illuminating the bank notes to be checked and for measuring the second wavelength. The use of specific optical filters has the disadvantage, however, that measurement of the filter characteristic permits conclusions to be drawn on the excitation wavelength or emission wavelength of the feature substance or substances. The omission of such specific filters considerably impedes the recognition of the employed feature substance or substances.

If infrared light is to be used for excitation, i.e. the first wavelength is to be in the infrared range, it is possible to use for example light-emitting diodes which emit light in the visible wavelength range, since they normally have a residual infrared emission in the order of magnitude of 1 percent of the radiated optical power. Alternatively it is also possible to use infrared and red light-emitting diodes. However, in both cases no filter is used in front of the sensor.

It is likewise possible to effect a simultaneous excitation with different wavelengths to conceal the excitation bands of the feature substance or substances. The different wavelengths can be realized for example by a plurality of light-emitting diodes which are accommodated in a single housing.

Further it is possible to obtain a concealment of the employed certain first and second wavelengths if a measurement of so-called quasi-resonant feature substances is effected. Here, first and second wavelengths are (approximately) equal, so that the evaluation of the remitted light is impeded because there is a concealment by the excitation light.

In the above-mentioned cases in which the use of filters is renounced or in which measurement is also to be effected during excitation with the certain first wavelength, it has proved advantageous to use logarithmic amplifiers or to switch the amplification for evaluating the signals from the employed sensor or sensors, since in these cases a very great volume range is required for evaluation.

A further improvement of the protection of the apparatus for checking the authenticity of bank notes can be obtained if the control device 35 which performs the evaluation of the data from the sensor assembly 30 is so protected that the checks carried out thereby as well as the reference data used therefor cannot be spied out.

For this purpose it is expedient to use for example a highly integrated circuit (e.g. ASIC, FPGA, FPAA, etc.) for realizing the control device 35. This makes it possible for example to prevent the characteristic of the signal from the sensor or sensors from being measured. A measurement of the photocurrent directly on the sensor or sensors is impossible without tampering with the apparatus, e.g. by incorporating additional amplifier stages, because of the small currents of the signals from the sensor or sensors in the single-digit nA range. It likewise prevents the stored software as well as the reference data from being read out without authorization, since they are protected by the hardware realization.

Protection of the control device 35 from spying out can also be obtained or improved if only approved software can be loaded into the memory of the control device 35.

This can be obtained for example by using signed software and checking the signature before software is loaded. Direct write access to the memory is not to be permitted from outside.

A further measure for protecting the software can be to check the integrity of the software in the working memory during operation, e.g. through the formation and check of check sums. This permits a change in the software to be recognized, since in this case the determined check sum does not match the expected check sum.

Further it can be provided to store the software and in particular also the reference data in a nonvolatile memory in encrypted form. The control device 35 causes the software to be loaded into the working memory when the apparatus is started, and decrypts the software as well.

It can also be provided that the check of the feature substances is effected in a pre-processing unit of the control device 35, e.g. a digital signal processor. The subsequent evaluation unit of the control device 35 then has no information about the feature substances. In this case it is sufficient to provide special protection for the pre-processing unit or the software thereof, while the evaluation unit can remain unprotected.

For the check it can be provided that in the pre-processing unit, e.g. decay behavior and/or intensity is determined for the light of the second wavelength coming from the feature substances for each test point and authenticity is determined therefrom for the respective test point. The control device 35 is supplied only the information "authentic" or "false" for each test point in order to determine the authenticity of the bank note. Thus, no information about the type of measurement and evaluation of the feature substances can be inferred from the data from the pre-processing unit. Additionally, the control device 35 can also be supplied the reasons for the determination of authenticity of the particular test point by the pre-processing unit, e.g. "decay behavior wrong", "intensity below given threshold", "overdrive", "offset too big (ambient light)", etc.

An improvement in the protection of the apparatus for checking the authenticity of bank notes can also be obtained if special feature substances are employed for the bank notes to be checked, whose measurement and evaluation necessitate special, interdependent examination steps.

If feature substances are employed whose emission wavelength changes in dependence on an applied magnetic field or whose decay behavior changes in the presence of a magnetic field, it is possible to effect an authentication for the bank notes to be checked wherein a defined magnetic field is additionally produced in the sensor assembly 35, e.g. by a permanent magnet. This causes a light of the second wavelength to be produced when the bank notes to be checked are illuminated with the light of the first wavelength whereby the second wavelength is additionally defined by the magnetic field. If the illumination is effected with light of the first wavelength without the magnetic field, light is emitted by the feature substances with a wavelength different from the second wavelength or the decay behaviors differ.

Special feature substances can also have different decay behavior. For example, a phosphorescent feature substance (great decay time) and a fluorescent feature substance (small decay time). The fluorescent feature substance covers the phosphorescent feature substance here, since both have the same emission wavelength.

To further mask the evaluation of measurements, it can be provided that there is a certain spatial arrangement of the feature substance or substances, e.g. depending on the denomination of the bank notes.

Instead of or in addition to feature substances with the above-described properties, it is also possible to employ feature substances that are absorbing or transparent to certain wavelength ranges, e.g. to infrared light.

It can likewise be provided that a feature substance is present on bank notes in different concentrations. For example, the feature substance can be present in a low concentration in the substrate of the bank notes, whereas the same feature substance is present in higher concentration in certain areas of the bank notes, e.g. in certain printed areas.

A selective evaluation of the feature substance is possible through different excitation pulses with the light of the first wavelength employed for illumination. Short excitation pulses suppress the paper feature, long excitation pulses single the paper feature out of the noise. This relation results since at a strong flash, i.e. large amplitude (and/or long pulse width) the higher-concentration area of the feature substance, e.g. in the printed image, is overdriven, while at a weak flash, i.e. smaller amplitude (and/or short pulse width) the feature substance present in low concentration in the substrate can no longer be detected. If bank notes to be checked are illuminated alternatingly with a strong flash and a weak flash it is possible, on the one hand, to detect the completeness of the bank notes by means of the feature substance present in low concentration throughout the substrate. On the other hand, it is also possible to detect codings, i.e. areas with higher concentration of the feature substance.

The invention has hitherto been described with reference to a bank note processing machine that is used for checking bank notes and sorting them in accordance with the check. However, it is obvious that the invention can be used wherever bank notes must be judged with regard to their authenticity, e.g. also in vending machines, cash deposit machines, cash deposit and dispensing machines, so-called recyclers, etc.

If feature substances present in bank notes are employed in the above-described manner for checking the authenticity of bank notes, the thereby obtained data of bank notes checked upon deposits can be stored to permit said bank notes to be later identified with reference to said data and associated with a depositor. This can be necessary for example when it turns out that one of the bank notes is forged. For this purpose said bank notes are processed again by means of an apparatus for checking authenticity and the thereby detected data are compared with the stored data to permit the desired identification to be carried out. It can be provided here that account is taken of the orientation in which the bank notes were originally processed. Account can likewise be taken of whether special circumstances were present upon the original check of the bank notes, e.g. whether the bank notes were transported obliquely through the checking apparatus. Such a deviation is stored together with the obtained data and can be taken into account upon the later identification.

In special cases it is thus possible to employ a particularly simple apparatus for checking the authenticity of bank notes for deposits. For example, it can be provided for the payment of parking fees in a car park to employ an apparatus for the check that determines exclusively the authenticity of the bank note as well as the denomination thereof. Additionally, the license number of the vehicle is detected and stored (e.g. as a photo and/or the license number derived automatically from the photo by OCR) together with the detected data of the bank note. Upon later discovery of a forgery it is thus possible to associate the license number with the corresponding bank notes.

The previously described variants can each be used singly in an apparatus for checking bank notes. They can likewise be combined with each other or other variants at will.

Further variants can result for example from the structure of the transport system 23.

If the transport system 23 has a high transport speed, it may be that the time available for excitation of the feature substances is so limited that reliable production of the light of the second wavelength by the feature substances is not ensured. In this case an additional illumination with the first wavelength can be provided before the sensor assembly 30, thereby prolonging the excitation time.

In another case, the transport system 23 can be designed such that it can be briefly stopped. The check of the bank notes can then be carried out by means of a surface camera (e.g. CCD camera) which photographs the particular bank note to be checked a certain time after illumination with light of the first wavelength. The stopping of the bank note can also be effected upon a change of transport direction, e.g. upon a change between longitudinal and transverse transport.

The invention claimed is:

1. An apparatus for checking the authenticity of bank notes in unprotected areas, comprising:

a sensor assembly containing a light source which produces light of a first wavelength with which the bank notes to be checked are illuminated, whereupon illumination by the first wavelength of one or more feature substances present in and/or on the bank notes produce light of a second wavelength detected by the sensor assembly; and a control device arranged to evaluate data received from the sensor assembly about the light of the second wavelength and compare the data with reference data to determine the authenticity of the bank notes;

wherein structure and operation of the sensor assembly and/or the control device permits conclusions to be drawn on the feature substance or substances contained in the bank notes without initially revealing the feature substance or substances contained in the bank notes, wherein the sensor assembly and control device is arranged to detect and evaluate at least one further property of the bank notes and is arranged to execute a check of the feature substance or substances only upon an indication of the presence of a bank note in the check of the further property and is arranged not to execute a check of the feature substance or substances upon an indication of the presence of a forged bank note in the check of the further property.

2. The apparatus according to claim 1, wherein the at least one further property relates to size and/or color and/or printed pattern of the bank notes to be checked.

3. The apparatus according to claim 1, wherein the light source employed for producing the light of the first wavelength and/or sensors of the sensor assembly employed for detecting the light of the second wavelength are constructed without specific filters for the first and/or second wavelength.

4. The apparatus according to claim 1, wherein the control device is a highly integrated circuit selected from the group consisting of ASIC, FPGA and FPAA.

5. The apparatus according to claim 1, wherein only approved, signed, software and/or reference data can be loaded into a memory of the control device.

6. The apparatus according to claim 1, wherein software and/or reference data are stored in a nonvolatile memory of the control device in encrypted form.

7. The apparatus according to claim 1, wherein only information about the authenticity of the bank notes to be checked that characterizes the bank notes as “authentic” or “false” is accessible outside the sensor assembly and/or the control device.

8. The apparatus according to claim 1, wherein during the check of the bank notes the apparatus carries out measurements and evaluations comprising interdependent examination steps.

9. The apparatus according to claim 1, wherein the sensor assembly has a magnet assembly arranged to produce a magnetic field penetrating the bank notes to be checked.

10. The apparatus according to claim 1, wherein the sensor assembly and the control device detect and evaluate feature substances with different rise behavior and/or decay behavior.

11. The apparatus according to claim 1, wherein the sensor assembly and the control device detect and evaluate feature substances which are transparent and/or absorbing to light of a certain wavelength, including infrared light.

12. The apparatus according to claim 1, wherein the sensor assembly and the control device detect and evaluate feature substances which have a predetermined spatial arrangement on the bank notes to be checked.

13. The apparatus according to claim 1, wherein the sensor assembly and the control device detect and evaluate feature substances with different concentration.

14. The apparatus according to claim 1, wherein the sensor assembly and the control device detect and evaluate feature substances such that the light source of the sensor assembly produces the light of the first wavelength alternatingly with different amplitude and/or pulse width.

15. The apparatus according to claim 1, wherein the data determined by the sensor assembly and the control device are stored for the checked bank notes and used for identifying bank notes, wherein the bank notes are identified by comparing data determined by means of a sensor assembly and a control device with stored reference data.

16. The apparatus according to claim 1, wherein a further light source for producing light of the first wavelength is disposed in or before the sensor assembly.

17. The apparatus according to claim 1, including a transport system which transports within the apparatus the bank notes to be checked, said transport system arranged to be stopped when a bank note to be checked is located in the area of the sensor assembly, said sensor assembly having a surface camera which records an image of the bank note to be checked after the transport system has been stopped.

* * * * *